July 21, 1970  A. T. VISSER  3,521,165
METER FOR MEASURING RMS VALUES OF PULSED CURRENT SIGNALS
Filed Sept. 20, 1968  2 Sheets-Sheet 1
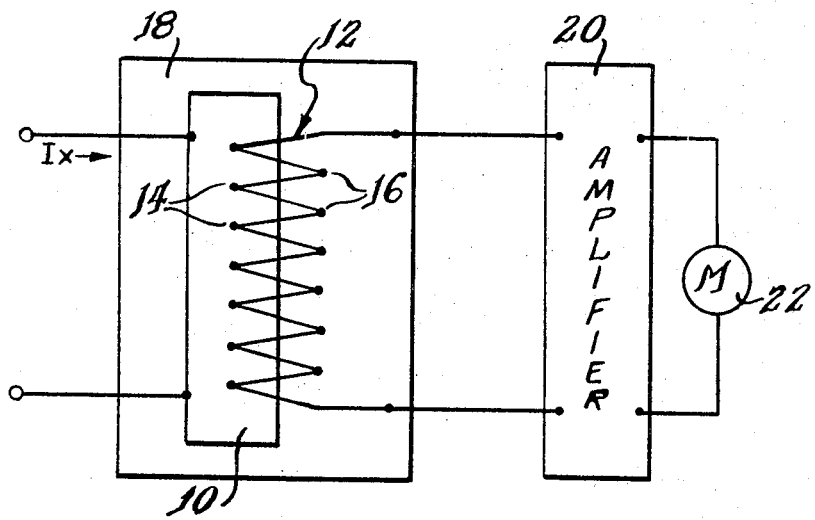
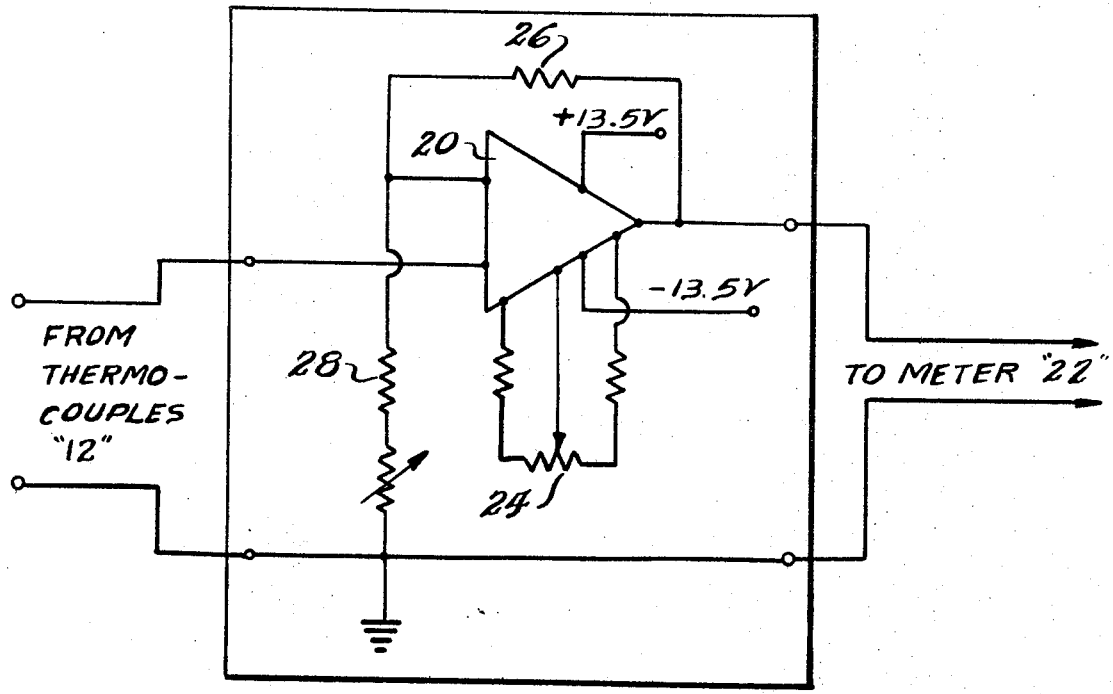
Inventor
Age T. Visser
Attorney Inventor
Age T. Visser
Attorney

United States Patent Office 3,521,165
Patented July 21, 1970

3,521,165
METER FOR MEASURING RMS VALUES OF PULSED CURRENT SIGNALS
Age T. Visser, Downers Grove, Ill., assignor to the United States of America as represented by the United States Atomic Energy Commission
Filed Sept. 20, 1968, Ser. No. 761,060
Int. Cl. G01r 19/24
U.S. Cl. 324—106            4 Claims

ABSTRACT OF THE DISCLOSURE

A pulsed signal RMS meter includes, connected across the signal, a resistor which is temperature-sensitive to the RMS value of the pulsed signal and has a thermal time constant greater than the time separation of the pulsed signals to remain relatively insensitive thereto. Thermocouples monitor the temperature of the resistor and provide an output which, when recorded, is a measure of the RMS value of the applied pulsed signal.

CONTRACTUAL ORIGIN OF THE INVENTION

The invention described herein was made in the course of, or under, a contract with the United States Atomic Energy Commission.

BACKGROUND OF THE INVENTION

The present invention relates to meters for measuring the RMS value of a signal and more particularly to meters for measuring the RMS value of a pulsed signal.

The heat losses in electrical conductors are proportional to the square of the RMS (root mean square) current flowing through the conductors. Thus, the rating of electrical equipment in amperes RMS specifies how many watts can be dissipated from the equipment without exceeding the maximum permissible temperature for the insulation material used. In general, there is no problem to measure the RMS value of a steady-state A-C or D-C current flowing through an electrical conductor. However, when a pulsed current flows through an electrical conductor, difficulty exists in measuring the RMS value thereof. It may be calculated from oscilloscope pictures of the pulsed current. However, such calculations are both inaccurate and time-consuming. It will be appreciated that the measurement of the RMS value of pulsed currents flowing in an electrical conductor should be able to be made accurately and quickly. For example, the ring magnet power supply for the zero gradient synchrotron particle accelerator at Argonne, Ill. produces pulsed currents with pulse periods in the order of 4 seconds. The shape of the current pulses from the power supply changes quite often depending upon the required operating conditions of the particle accelerator. It is desirable that the RMS value of the current pulses be known, so that the power supply can be operated close to its rated capacity, whereby the maximum permissible number of pulses per minute may be produced.

Accordingly, it is one object of the present invention to provide a meter for measuring the RMS value of a pulsed signal applied thereto.

It is another object of the present invention to provide a meter capable of accurately and quickly measuring the RMS value of pulsed signals applied thereto.

Other objects of the present invention will become apparent as the detailed description proceeds.

In general, the pulsed signal RMS meter of the present invention comprises means temperature-sensitive to the RMS value of the pulsed signal and having a thermal time constant greater than the time separation of the pulsed signals to remain relatively insensitive thereto. Means are provided for coupling the temperature-sensitive means to the pulse signals and for measuring the temperature of the temperature-sensitive means.

BRIEF DESCRIPTION OF THE DRAWINGS

Further understanding of the present invention will be obtained from consideration of the accompanying drawings wherein:

FIG. 1 is a schematic diagram of a preferred embodiment for the practice of the present invention.

FIG. 2 is a detailed schematic of the amplifier of FIG. 1.

DESCRIPTION OF THE PREFERRED EMBODIMENT

Figure 3:
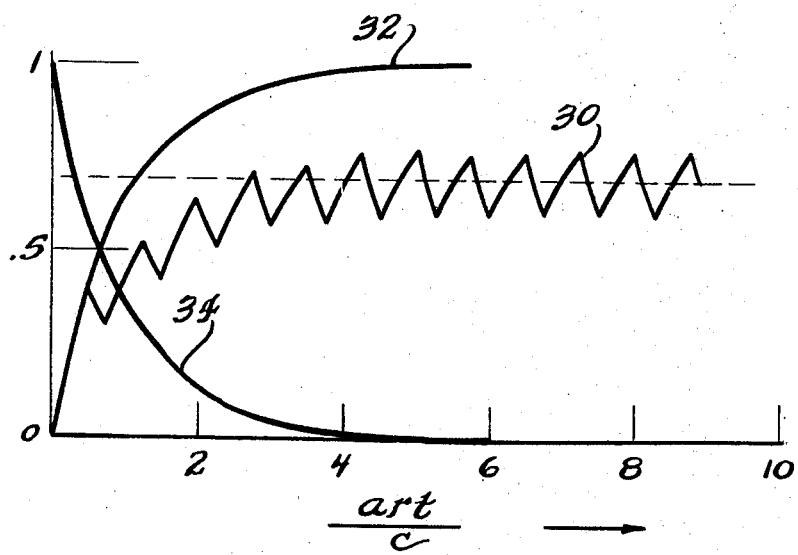
FIG. 3 is a graphical plot of typical thermal characteristics of the resistor of FIG. 1.

In FIG. 1, a precision resistor 10 is connected so that the unknown pulsed signal $I_x$ flows therethrough. A plurality of thermocouples 12 have their hot junctions 14 mounted to the resistor 10 and their cold junctions 16 mounted in the ambient medium about the resistor 10. The resistor 10, together with the thermocouples 12, is mounted in an oven 18.

The hot and cold junctions 14 and 16 of the thermocouples 12 are serially connected, as shown, across the input of an amplifier 20. The output of the amplifier 20 is fed to a meter 22.

In operation, $I_x$, the unknown pulsed signal, flows through the precision resistor 10 to cause heating thereof. The higher the signal $I_x$, the higher the temperature of resistor 10 rises. This temperature rise is proportional to the square of the RMS value of the pulsed signal $I_x$ regardless of the shape of the signal and whether it is A-C or D-C. The thermocouples 12 measure the temperature rise of the resistor 10 above the ambient temperature of the medium surrounding the resistor 10 to provide an RMS value of the signal $I_x$. The cold junctions 16 of the thermocouples 12 are mounted in the medium to provide a measure of the ambient temperature thereof, while the hot junctions 14 of thermocouples 12 are mounted to the resistor 10 to sense the temperature of the resistor. The temperature rise of the resistor 10 generates a thermal EMF between the ends of the series-connected thermocouples 12. Changes in ambient temperature of the medium cause an undesirable drift effect on the output voltage of the thermocouples 12. Accordingly, it is preferred that the oven 18 be used for the practice of the present invention, whereby the ambient temperature of the medium surrounding the resistor 10 can be maintained at a constant value.

It is preferred that the amplifier 20 present a high input impedance to the output of the thermocouples 12 and an output impedance of almost zero ohms to the meter 22. With this structure, direct coupling of the thermocouples 12 may be avoided and external loading thereof reduced. Such an amplifier construction is shown in schematic detail in FIG. 2. The amplifier 20 is a conventional voltage follower amplifier with a drift (D-C offset) in the order of 1% or 1 millivolt per 24 hours, which drift can be manually reduced to zero with the externally mounted balance potentiometer 24, while the input to the amplifier is shorted. The resistors 26 and 28 provide a feedback network for the amplifier wherewith the gain of the amplifier may be adjusted.

Further appreciation of the present invention may be obtained by considering the heating and cooling of the resistor 10 with the application of the pulsed signal $I_x$ thereto. A body in which an energy of $q$ watts is dissipated will rise higher and higher in temperature and the heat loss to the ambient medium about the body will increase until finally the heat lost to the ambient medium balances the dissipated power in the body. At first a part of the dissipated power is used to raise the temperature of the body, while the remainder is lost to the ambient medium. The sum of the power required for the temperature rise and the power lost to the ambient medium equals the total dissipated power at all times and may be expressed by the formula:

$$qdt = cdt + arTdt \quad (1)$$

where:

$q$ = the dissipated heat in the body (watts)
$c$ = heat capaicty, i.e. heat required to raise the body temperature 1° C. (watt sec./° C.)
$a$ = the surface area of the body (cm.$^2$)
$r$ = the energy conveyed to the ambient medium through 1 cm.$^2$ of the body area at 1° C. temperature differential (watt/° C. cm.$^2$)
$T$ = the temperature of the body above ambient (° C.)
$t$ = time (sec.)

Solving Equation 1 gives $$T = \frac{q}{ar}\left(1 - e^{-\frac{ar}{c}t}\right) \text{ for } T = 0 \text{ at } t = 0 \quad (2)$$

or $$T = \frac{q}{ar} - \frac{q - arT_1}{ar} e^{-\frac{ar}{c}t} \text{ for } T = T_1 \text{ at } t = 0 \quad (3)$$

Equation 2 indicates an exponential temperature rise to the final temperature $q/ar$. It will be noted that the final temperature rises linearly with $q$, but the time required to reach the final temperature is independent of $q$. The thermal time constant of the body $c/ar$ seconds.

The dissipated heat $q$ equals zero during cooling from a temperature $T_1$, for which case Equation 3 can be written as $$T = T_1 e^{-\frac{ar}{c}t} \quad (4)$$

In the present invention, the pulsed signal $I_x$ through the precision resistor 10 can be considered as a series of heating and cooling periods and FIG. 3 shows how finally an average temperature is reached by the resistor 10 upon the application thereto of the pulsed signal $I_x$. This is shown in plot 30. The plot 32 shows the exponential heating characteristics of the precision resistor 10 for a constant value signal applied thereto and plot 34 shows the exponential cooling characteristics of the precision resistor 10.

It will be seen from plot 30 in FIG. 3 that the instantaneous temperature of the resistor 10 fluctuates about the average temperature. For the practice of the present invention, it is desirable that this fluctuation about the average be kept small, so that the indicator of meter 22 is steady to permit accurate and simple reading. It has been found that acceptable reading of the meter 22 may be effected provided that the pulsed input signals $I_x$ do not vary the resistor temperature approximately more than 1% about its average temperature. To provide these operatiing characteristics, the precision resistor 10 is chosen so that its thermal time constant is substantially greater than the time separation of the pulses so that it remains relatively insensitive thereto. This may be further appreciated by the application of the present invention to rectangular input pulses $I_x$ having a duration of 2 seconds and a time separation therebetween of 2 seconds. Using cooling Equation 4 and the requirement of 1% temperature variation during 2 second of cooling, it follows:

At $t = 0$, Equation 4 gives $$T = T_1 e^{-\frac{ar}{c} \times 0} = T_1$$

At $t = 2$, Equation 4 gives $$T = T_1 e^{-\frac{ar}{c} \times 2} = 0.99 T_1$$

Thus:

$$e^{-\frac{ar}{c} \times 2} = 0.99$$

$$\frac{2}{c/ar} = \frac{1}{100}$$

$$\frac{c}{ar} = 200 \text{ sec.}$$

Thus, the thermal time constant of the precision resistor 10 for such applied input pulses should be approximately 200 seconds and a resistor having these characteristics reaches 63% of its final temperature for constant heating in 200 seconds.

In the practice of the preferred embodiment, a wire-wound precision resistor 10 was used with iron-constantan thermocouples having their hot junctions mounted within the interior of the resistor 10. It will be further appreciated that for the practice of the present invention the ohmic value of the precision resistor 10 must be small enough so that it does not seriously change the flow of the unknown pulsed signal $I_x$ and the watt rating of the resistor 10 must be larger than the maximum expected dissipated power.

Figure 4:
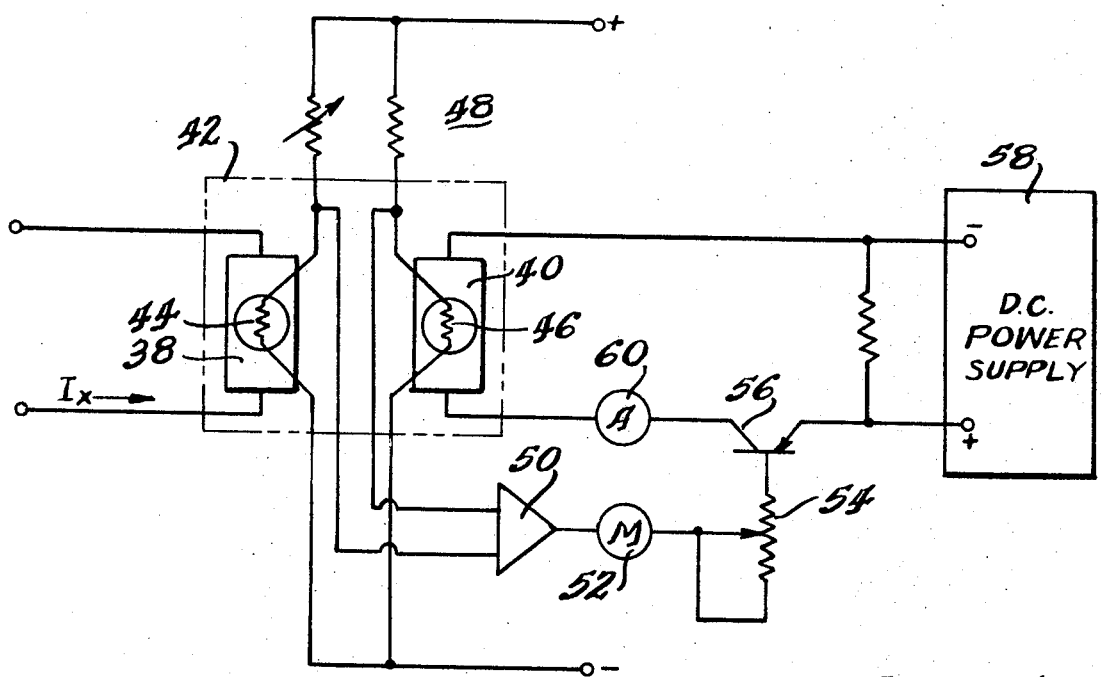
FIG. 4 is an electrical schematic of an alternate apparatus for the practice of the present invention.

An alternate embodiment for the practice of the present invention is shown in FIG. 4. In the embodiment of FIG. 4, no oven is used, thereby avoiding the delay of waiting for the temperature of the oven to settle out. In the embodiment of FIG. 4, two identical precision resistors 38 and 40 are used. The resistors 38 and 40 each have like thermal characteristics, as described for the resistor 10 in the embodiment of FIG. 1. The precision resistor 38 is connected to the unknown pulsed signal $I_x$. The resistors 38 and 40 are housed in a common enclosure 42. Two matched thermistors 44 and 46 are respectively mounted in an associated resistor 38 and 40 so that their impedance changes responsive to the temperature of the resistor in which they are mounted. The thermistors 44 and 46 are mounted to form adjacent arms in a Wheatstone bridge 48. The output of the Wheatstone bridge 48 is connected tthrough an amplifier 50 to drive a servomotor 52 and vary the value of a resistance 54 responsive thereto. The resistor 54 controls the bias voltage to the base of a transistor 56. A D-C supply 58 is connected across the precision resistor 40 via the transistor 56. An ammeter 60 is connected to read the current flowing through the transistor 56 to the resistor 40.

In operation, the Wheatstone bridge 48 is initially balanced. The unknown pulsed signal $I_x$ is applied to the precision resistor 38 to cause heating thereof, as described for the resistor 10 of FIG. 1. Thus, the temperature rise of precision resistor 38 is proportional to the square of the RMS value of the applied pulsed signal $I_x$. Heating of the resistor 38 by the signal $I_x$ causes an impedance change in the thermistor 44 and an unbalancing of the bridge 48. Unbalacing of the bridge 48 by an impedance change in thermistor 44 causes an output signal to be delivered to the servomotor 52 and, responsive thereto, a change in the value of the resistance 54. The change in the value of resistor 54 causes a change in the current flowing through transistor 56 from the supply 58 to the precision resistor 40. This current will continue to be adjusted until its value causes a temperature rise in the precision resistor 40 sufficient to case an impedance change in thermistor 46 to balance the bridge 48. At this time, the current flowing through the ammeter 60 is equal to the RMS value of the unknown pulsed signal $I_x$ applied to the precision resistor 38.

Persons skilled in the art will, of course, readily adapt the general teachings of the invention to embodiments far different from the embodiments illustrated. Accordingly, the scope of the protection afforded the invention should not be limited to the particlar embodiments illustrated in the drawings and described above, but should be determined only in accordance with the appended claims.

What I claim is:

1. A pulsed-signal RMS meter comprising first and second resistors each temperature-sensitive to the RMS value of said pulsed signal and having like thermal time constants greater than the time separation of said pulsed signals to remain relatively insensitive thereto, means for coupling said first resistor to said pulsed signals, a variable-power supply, means for coupling the output of said power supply to said second resistor, first and second means impedance-sensitive to the temperature of said first and second resistors respectively, bridge circcuit means including said first and second impedance-sensitive means to form adjacent arms thereof, means for varying the value of the output of said power supply responsive to the output of said bridge circuit means, and means for measuring the output value of said power supply.

2. The apparatus according to claim 1 wherein said first and second resistors each have a thermal time constant of $100t$ where $t=$the time separation between said pulsed signals.

3. The apparatus according to claim 2 wherein said first and second impedance-sensitive means comprise first and second like thermistors mounted to an associated first and second resistor, respectively.

4. The apparatus according to claim 3 wherein said power supply output varying means comprise a transistor including an emitter, a collector and a base; the output of said power supply being connected via said transistor emitter and collector to said second resistor; variable resistor means connected to the base of said transistor to control the bias thereof and hence the current flow through said emitter and collector, and motive means responsive to the output of said bridge cricuit means for controlling the value of said resistor means and hence the value of current from said power supply through said second resistor to balance said bridge.

References Cited

UNITED STATES PATENTS

| | | | |
|---|---|---|---|
| 2,429,200 | 10/1947 | Bradley et al. | 324—106 XR |
| 3,210,663 | 10/1965 | Moseley et al. | 324—106 XR |
| 3,440,536 | 4/1969 | Ronci | 324—106 |

OTHER REFERENCES

Hewlett-Packard Journal—"An RMS-Responding Voltmeter With High Crest Factor Rating," January 1964, vol. 15, No. 5, pp. 1–5.

ALFRED E. SMITH, Primary Examiner